(12) United States Patent
Jones et al.

(10) Patent No.: US 7,562,295 B1
(45) Date of Patent: Jul. 14, 2009

(54) REPRESENTING SPELLING AND GRAMMATICAL ERROR STATE IN AN XML DOCUMENT

(75) Inventors: Brian Jones, Redmond, WA (US);
Robert Little, Redmond, WA (US);
Marcin Sawicki, Kirkland, WA (US);
Andrew Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 70 days.

(21) Appl. No.: 10/727,299

(22) Filed: Dec. 3, 2003

Related U.S. Application Data

(63) Continuation-in-part of application No. 10/187,060, filed on Jun. 28, 2002.

(51) Int. Cl.
*G06F 17/00* (2006.01)

(52) U.S. Cl. ..................... 715/257; 715/234

(58) Field of Classification Search ............... 715/533, 715/513, 257, 234; 707/E12.123
See application file for complete search history.

(56) References Cited

U.S. PATENT DOCUMENTS

| | | | | |
|---|---|---|---|---|
| 4,751,740 A | 6/1988 | Wright | | 382/180 |
| 4,864,501 A * | 9/1989 | Kucera et al. | | 704/8 |
| 4,866,777 A | 9/1989 | Mulla et al. | | 704/206 |
| 5,185,818 A | 2/1993 | Warnock | | 382/54 |
| 5,295,266 A | 3/1994 | Hinsley et al. | | 718/101 |
| 5,557,722 A | 9/1996 | DeRose et al. | | 715/513 |
| 5,579,466 A | 11/1996 | Habib et al. | | 715/529 |
| 5,586,241 A | 12/1996 | Bauermeister et al. | | 395/167 |
| 5,781,714 A | 7/1998 | Collins et al. | | 395/171 |
| 5,787,451 A * | 7/1998 | Mogilevsky | | 715/533 |
| 5,881,225 A | 3/1999 | Worth | | 726/17 |
| 5,895,476 A | 4/1999 | Orr et al. | | 707/517 |
| 6,023,714 A | 2/2000 | Hill et al. | | 715/513 |
| 6,031,989 A | 2/2000 | Cordell | | 717/109 |
| 6,044,387 A * | 3/2000 | Angiulo et al. | | 715/533 |
| 6,092,068 A | 7/2000 | Dinkelacker | | 707/100 |
| 6,119,136 A | 9/2000 | Takata et al. | | 715/513 |
| 6,141,754 A | 10/2000 | Choy | | 726/1 |
| 6,182,029 B1 | 1/2001 | Friedman | | 704/9 |
| 6,209,124 B1 | 3/2001 | Vermeire et al. | | 717/114 |
| 6,230,173 B1 | 5/2001 | Ferrel et al. | | 715/513 |
| 6,233,592 B1 | 5/2001 | Schnelle et al. | | 715/513 |
| 6,249,794 B1 | 6/2001 | Raman | | 715/500 |
| 6,336,124 B1 | 1/2002 | Alam et al. | | 715/523 |

(Continued)

FOREIGN PATENT DOCUMENTS

EP    1230566    8/2002

OTHER PUBLICATIONS

Munro, J., "StarOffice 6.0 Lives Up to its Name," PCMAG.com, May 23, 2002,www.pcmag.com/print_article2/0, 1217,a=27287,00.asp, downloaded pp. 1-3.*

(Continued)

*Primary Examiner*—Laurie Ries
(74) *Attorney, Agent, or Firm*—Merchant & Gould, P.C.

(57) ABSTRACT

The present invention provides markers for spelling and grammar errors and the proofing state of a word-processing document stored as an XML file. The markers are used to show where a spelling or grammar error has occurred within the document. The proof state indicates whether the document been fully checked for spelling or grammatical errors.

21 Claims, 6 Drawing Sheets

U.S. PATENT DOCUMENTS

| | | | |
|---|---|---|---|
| 6,397,232 B1 | 5/2002 | Cheng-Hung et al. | 715/523 |
| 6,507,856 B1 | 1/2003 | Chen et al. | 715/513 |
| 6,507,857 B1 | 1/2003 | Yalcinalp | 715/513 |
| 6,519,617 B1 | 2/2003 | Wanderski et al. | 715/513 |
| 6,535,896 B2 | 3/2003 | Britton et al. | 715/523 |
| 6,538,673 B1 | 3/2003 | Maslov | 715/853 |
| 6,613,098 B1 | 9/2003 | Sorge et al. | 715/503 |
| 6,675,353 B1 | 1/2004 | Friedman | 715/513 |
| 6,697,999 B1 | 2/2004 | Breuer et al. | 715/517 |
| 6,725,423 B1 | 4/2004 | Muramoto et al. | 715/513 |
| 6,725,426 B1 | 4/2004 | Pavlov | 715/523 |
| 6,754,648 B1 | 6/2004 | Fittges et al. | 707/1 |
| 6,763,500 B2 | 7/2004 | Black et al. | 715/513 |
| 6,785,685 B2 | 8/2004 | Soetarman et al. | 707/101 |
| 6,799,299 B1 | 9/2004 | Li et al. | 715/513 |
| 6,829,570 B1 | 12/2004 | Thambynayagam et al. | 703/10 |
| 6,829,745 B2 | 12/2004 | Yassin et al. | 715/513 |
| 6,845,483 B1 | 1/2005 | Carroll | 715/513 |
| 6,886,115 B2 * | 4/2005 | Kondoh et al. | 714/52 |
| 6,918,086 B2 * | 7/2005 | Rogson | 715/533 |
| 6,928,610 B2 | 8/2005 | Brintzenhofe et al. | 715/517 |
| 6,938,204 B1 | 8/2005 | Hind et al. | 715/515 |
| 6,941,510 B1 | 9/2005 | Ozzie et al. | 715/513 |
| 6,954,898 B1 | 10/2005 | Nakai et al. | 715/542 |
| 6,968,503 B1 | 11/2005 | Chang et al. | 715/526 |
| 6,996,772 B2 | 2/2006 | Justice et al. | 715/513 |
| 7,028,009 B2 | 4/2006 | Wang et al. | 705/51 |
| 7,257,772 B1 | 8/2007 | Jones et al. | 715/530 |
| 7,275,209 B1 | 9/2007 | Jones et al. | 715/513 |
| 7,376,650 B1 | 5/2008 | Ruhlen | 707/6 |
| 7,389,473 B1 | 6/2008 | Sawicki et al. | 715/255 |
| 2001/0014900 A1 | 8/2001 | Brauer et al. | 707/513 |
| 2001/0032217 A1 | 10/2001 | Huang | 707/513 |
| 2002/0087702 A1 | 7/2002 | Mori | 709/228 |
| 2002/0091725 A1 | 7/2002 | Skok | 707/501.1 |
| 2002/0124115 A1* | 9/2002 | McLean et al. | 709/310 |
| 2002/0184189 A1 | 12/2002 | Hay et al. | 707/1 |
| 2003/0007014 A1 | 1/2003 | Suppan et al. | 345/853 |
| 2003/0018668 A1 | 1/2003 | Britton et al. | 707/513 |
| 2003/0101416 A1 | 5/2003 | McInnes et al. | 715/513 |
| 2003/0135584 A1 | 7/2003 | Roberts et al. | 709/218 |
| 2003/0163784 A1 | 8/2003 | Daniel et al. | 715/514 |
| 2003/0167444 A1 | 9/2003 | Zorc | 715/513 |
| 2003/0231626 A1 | 12/2003 | Chuah et al. | 370/389 |
| 2004/0073871 A1 | 4/2004 | Giannetti | 715/513 |
| 2004/0098320 A1 | 5/2004 | Mitsuhashi et al. | 705/27 |
| 2004/0194035 A1 | 9/2004 | Chakraborty | 715/531 |
| 2004/0205553 A1 | 10/2004 | Hall et al. | 715/513 |
| 2004/0210818 A1 | 10/2004 | Jones et al. | 715/500 |
| 2005/0102265 A1 | 5/2005 | Jones et al. | 707/1 |
| 2005/0108198 A1 | 5/2005 | Jones et al. | 707/1 |
| 2005/0108278 A1 | 5/2005 | Jones et al. | 707/102 |

OTHER PUBLICATIONS

Castro, E., "XML for the World Wide Web, Visual Quickstart Guide," Peachpit Press, 2001, p. 245.*

Rodriguez, M., "XML::Twig," xmltwig.com, copyright 2003, downloaded pp. 1-4, web.archive.org/web/20030422002120/http://www.xmltwig.com/xmltwig/tools/xml_spellceck.*

XMetal 1.0, Webreference.com, Oct. 28, 1999, downloaded pp. 1-2, www.webreference.com/html/watch/xmetal/5.html.*

Simpson, J., "Just XML," Prentice Hall, Second Edition, 2001, cover, copyright page, and p. 31.*

"Introduction to XML," University of Washington Computing and Communications, copyright 1999, on the Internet as of Jun. 24, 2001, downloaded from: http://web.archive.org/web/20010624123830/http://www.washington.edu/computing/training/540/xml_well.html, 1 page.*

Pradeep Jain; "Creating XML from Microsoft Word: The Challenges", Dec. 3-8, 2000, pp. 136-144.

Jon Bosak, "XML: The Universal Publishing Format", 1998, pp. 1-2.

M. Fernandez et al., "Advanced Technology Seminar", p. 323.

Uros Novak et al., "Experimental XSLT Processor for Objects", Proceedings of the IASTED International Conference, Applied Informatics, Feb. 18-21, 2002, pp. 277-282.

"XML Schema Part 1: Structures", W3C Recommendation, May 2, 2001, downloaded from http://www.w3.org/TR2001/REC-xmlschema-1-20010502/, pp. 1-19.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.

Ayers, Larry, "AbiWord's Potential", Linux Gazette, Issue 43, Jul. 1999, pp. 1-4.

"XML Schema for AbiWord Markup Language", downloaded from http://www.abisource.com/awml.xsd, May 27, 2000, pp. 1-3.

Wen, Howard, "AbiWord: Open Source's Answer to Microsoft Word", Linux Dev Center, downloaded from http://www.linuxdevcenter.com/lpt/a/1636, Mar. 14, 2002, pp. 1-3.

Dzuba, Vassili, "Majix 1.0: A Word to XML Converter", downloaded from http://xml.coverpages.org/majix10Ann.html, Oct. 6, 1998, pp. 1-2.

Schmelzer, Ronald, "ZapThink Briefing Note—HyperVision—Automating Valid XML Document Creation Within Microsoft Word", ZapThink LLC, Feb. 8, 2002, pp. 1-6.

Alschuler, Liora, "Getting the Tags In: Vendors Grapple With XML-Authoring, Editing and Cleanup", Seybold Report on Internet Publishing, vol. 5, No. 6, Feb. 2001, pp. 1-6.

Moseley, Lonnie et al., "Mastering Microsoft Office 97 Professional Edition", Sybex, 1996, pp. 87, 94-98, 103-105, 165-179, 1114-1115.

"AbiWord", http://en.wikipedia.org/wiki/AbiWord>, Oct. 19, 2005, 2 pgs.

Walther, P., "XML Dokumente in Microsoft Word mit neuem Produkt der struktur AG kostenlos testen", http://www.contentmanager.de/magazine/news_h2695_xml_dokumente_in_microsoft_word_mit_neuem.html>, Jun. 5, 2002, 2 pgs.

Chipr, "AbiWord—Word Processing For Everyone", http://www.kuro5hin.org/?op=displaystory;sid=2002/4/22/22406/9615>, Apr. 23, 2002, 8 pgs.

"Introduction to AbiWord", http://web.archive.org/web/20010608211934/www.abisource.com/help/en-US/index.htm, Jun. 8, 2001, 3 pgs.

"XML Schema for AbiWord Markup Language", http://www.abisource.com/awml.xsd>, Apr. 27, 2000, 3 pgs.

Liefke, Harmut et al., "Xmill: An Efficient Compressor for XML Data", SCM SIGMOD Record, vol. 29, Issue 2, May 2000, pp. 153-164.

McGrath, Robert, "Representing "Binary" Data in XML", downloaded from http://ndf.ncsa.uiuc.edu/HDF5/XML/tools/binary.html, Mar. 2001, pp. 1-4.

Jeong, Euna et al., "Semistructured Data: Induction of Integrated View for XML Data With Heterogeneous DTDs", Proceedings of the Tenth International Conference on Information and Knowledge Management, Oct. 2001, pp. 151-158.

"XML Schema—Lecture 4 Notes", downloaded from http://www.cs.rpi.edu/~puninj/XMLJ/classes/class4/all.html, Nov. 21, 2001, pp. 1-14.

Mansfield, Ron, "Mastering Word 97 Fourth Edition", 1997, Sybex, pp. 269-270, 412, 449-457, 985-986, 1010-1011, 1028-1029, 1031-1034.

M. Schrage, "Proxima, A presentation-oriented editor for strucctured documents", IPA, ISBN 12-345-6789-0, Jun. 4, 1973, pp. 1-186.

V. Turau, "Making legacy data accessible for XML applications", University of Applied Sciences, Department of Computer Science, Wiesbaden, Germany, 1999, pp. 1-11.

J. Geigel et al., "Automatic Page Layout Using Genetic Algorithms for Electronic Albuming", Proceedings of Electronic Imaging, Jan. 21-26, 12 pgs.

M. Kirjavainen, "XML Browsers", http://mia.ece.uic.edu/~papers/WWW/MultimedicaStandards/XML_browsers.pdf, last accessed Mar. 14, 2005, 16 pgs.

Rusty Elliotte, "XML Bible", IDG Books Worldwide, Inc., 1999, pp. 1-12, 120-127, 333-335.

Microsoft, "Microsoft Word 2000", 1999, Microsoft, Screenshots 1-7, pp. 1-2.

Oliver Meyer, "Creating Validated XML Documents on the Fly Using MS Word", Oct. 20, 2002, pp. 113-121.

Altova Inc. & Altova GmbH, "XML Spy 4.0 Manual," copyright 1998-2001, Sep. 10, 2001, downloaded from: http://www.altova.com/download.sub.—archive.html and link, pp. 18-286.

"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.

M. Fernandez and S. Amer-Yahia; Advanced Technology Seminar 2—Techniques for Storing XML; pp. 323, 774-776.

Michael Champion; Storing XML in Databases; EAI Journal, Oct. 2001; pp. 53-55.

JP Morgenthal; XML for Data Integration; EAI Journal, Oct. 2001; pp. 13-14, 16.

Sihem Amer-Yahia, Mary Fernandez, Divesh Srivastava and Yu Xu; PIX: A System for Phrase Matching in XML Documents: A Demonstration; 2003 IEEE; pp. 774-776.

Altova Inc. & Altova GmbH, "XML Spy 4.0 Manual," copyright 1998-2001, published Sep. 9, 2001, pp. 1-401.

Alshuler, L., "Getting the Tags In: Vendors Grapple with XML-Authoring, Editing, and Cleanup," The Seybold Report on Internet Publishing, vol. 5, No. 6, Feb. 2001, pp. 1-6.

HV, Ltd., "WorX Standard Edition (SE) 'XML Authoring Made Easy'," HyperVision, Ltd., published on the Internet as of Jun. 3, 2001 as a PDF file linked to http://web.archive.org/web/20010603152210/www.hvltd.com/default.asp?name=information/xml/worxseOverview.xml&display=information/xsl/default.xsl, pp. 1-9.

Mathias Neumuller and John N. Wilson; Improving XML Processing Using Adapted Data Structures; Oct. 7-10, 2002; pp. 206-220.

Surajit Chaudhuri and Kyuseok Shim; Storage and Retrieval of XML Data using Relational Databases; Advanced Technology Seminar 4; Abstract; Mar. 5, 2003; p. 802.

Ullas Nambiar et al.; Efficient XML Data Management: An Analysis; EC-Web 2002, LNCS 2455; pp. 87-98.

Volkan Atalay and Erkan Arslan; An SGML Based Viewer for Form Documents; 1999 IEEE Jul. 1999; pp. 201-204.

Xin Zhang et al.; Clock: Synchronizing Internal Relational Storage with External XML Documents; 2001 IEEE Jun. 2001; pp. 111-118.

Robert D. Cameron; REX: XML shallow parsing with regular expressions; Markup Languages: Theory & Practice 1.3, Summer 1999; pp. 61-88.

Danny Heijl; The Delphi XML SAX2 Component & MSXML 3.10; Dr. Dobb's Journal, Sep. 2001; pp. 42-54.

Chiyoung Seo et al.; An efficient inverted index technique for XML documents using RDBMS; Received Jan. 16, 2002; Information and Software Technology 45 (2003), Jun. 1, 2002; pp. 11-22.

Torsten Grabs et al.; XMLTM: Efficient Transaction Management for XML Documents; CIKM'02, Nov. 4-9, 2002; pp. 142-152.

Michael Floyd, "Debugging XML Applications", Aug. 2000, www.webtechniques.com, pp. 79-81.

James E. Powell, "Microsoft Office Beta 2 on the Horizon", WinMag.com, Nov. 3, 2000.

Milbery, J., "WorX SE", XML Journal, published Feb. 4, 2001, downloaded from http://xml.sys-con.com/read/40149.htm, downloaded pp. 1-5.

Patrick Marshall, "DocuShare 2.0 Makes Web Document Management Work", Sep. 27, 1999.

Dan Franks, "Crowd Control (Secrets)", Jun. 1, 2002, MacWorld, vol. 19, No. 6, p. 102.

John Lombardi, "Word Pro Excels at 'Team' Work", Info World, Jan. 8, 1996, p. 86.

Kathy Yakal, "Elegant Document Distribution", Computer Shopper, Nov. 1995, pp. 1-2.

Jon Udell, "Getting Traction", Jul. 12, 2002.

Sun Microsystems, "StarOffice XML File Format Working Draft", Jan. 2001, Draft 10, pp. 19, 89, 142, and 234, http://web.archive.org/web/20010603030227/xml.openoffice.org/xml_specification_draft.pdf.

Y. Ishitani, "Document Transformation System from Papers to XML Data Based on Pivot XML Document Method", IEEE Computer Society, Seventh International Conference on Document Analysis and Recognition, 6 pgs., Aug. 3-6, 2003.

Altamura et al., "Transforming paper documents into XML format with Wisdom++", Nov. 7, 2000, IJDAR, pp. 6-12.

Klink et al., "Document Structure Analysis Based on Layout and Textual Features", Sep. 25, 2000, DFKI, pp. 1a, 3, 4, and 11.

"Creating DocBook Documents", Aug. 2, 2001, pp. 1 and 16, http://web.archive.org/web/20020615124747/www.docbook.org/tdg/en/html/ch02.html.

David Eisenberg, "Using XSL Formatting Objects", Jan. 17, 2001, pp. 1a and 1, http://www.xml.com/pub/a/2001/01/17/xsl-fo/index.html?page=2.

"Star Office XML File Format Working Draft", Sun Microsystems, Inc., pp. 57, 59.

W. Wadge, "Intensional Markup Language", Proceedings of the Third International Workshop, DCW 2000, Quebec City, Canada, Jun. 19-21, 2000, pp. 82-89.

Unicode Inc., "Unicode Technical Rpeorts", Sep. 21, 2002, pp. 1, 2, 638, 642, and 644.

Star Office XML File Format Working Draft, Sun Microsystems, Inc., pp. 1, 19, and 196.

Rohr, Paul, "RE: Styles Again", downloaded from http://www.abisource.org/mailinglists/abiword-dev/01/May/0561.html, May 2001, pp. 1-2.

W3C, "XML Schema Requirements", W3C Note, Feb. 15, 1999, downloaded from www.w3.org/TR/NOTE-xml-schema-req, pp. 1-5.

Ray, Erik T., "Learning XML", O'Reilly & Associates, Inc., Jan. 2001, cover, copyright, and Chapter 5 downloaded pp. 1-25.

Glenn, Walter, "Word 2000 in a Nutshell", O'Reilly & Associates, Inc., Aug. 2000, cover, copyright, and sections 16.4 and 16.3, downloaded pp. 1-8.

Liberty, J. et al., "XML Web Documents from Scratch", Que Corporation, Mar. 10, 2000, cover, copyright, chapters 1 and 2, downloaded pp. 1-16.

Watchorn, H. et al., "Word and XML: Making the 'Twain Meet'", XML Europe 2001, papers, May 2001, downloaded pp. 1-11.

Novak, U. et al., "Experimental XSLT Processor for Objects", Proceedings of the JASTED Int'l Conf. On Applied Informatics, Feb. 2002, pp. 277-282.

XML Workshop Ltd., "Word to XML Converters", Mar. 7, 2003, downloaded pp. 1-2.

YAWC Pro, "Welcome to YAWC Pro", Dec. 11, 2001, 1 pg.

"YAWC Pro 1.0 Installation & User Guide", pp. 1-11.

"Case Study: Converting Word Into XML", YAWC Pro, 1 pg.

"Case Study: Maintaining Websites with Microsoft Word", YAWC Pro, 1 pg.

"Case Study: Publishing Content to the Web and Mobile Phones", YAWC Pro., 1 pg.

"Case Study: Typsetting XML with QuarkXPress", YAWC Pro, 1 pg.

Skylar, D., "The Annotated Rainbow DTD, Rainbow Version 2.5", Electronic Book Technologies, Inc., Feb. 8, 1995, pp. 1-12.

Tetrasix, "Welcome to Tetrasix Web Site", re: MajiX, Apr. 18, 2001, downloaded pp. 1-3.

Infinity-Loop, Web Site Home Page, re: infinity-loop, Apr. 20, 2001, 1 pg.

Sun Microsystems, "The OpenOffice.org Source Project", Sun Microsystems, Inc., 2000, downloaded pp. 1-34.

Harold, Rusty Elliotte, "XML Bible", IDG Books Worldwide, 1999, pp. 369-388.

W3C, "XML Schema Part 0: Primer", W3C Recommendation, May 2, 2001, downloaded pp. 1-67.

Case Western Reserve University (CRWU), "Introduction to HTML", Case Western Reserve University and Eric A. Meyer, Mar. 4, 2000, downloaded from web.archive.org/web/20000304042655/http://www.cwru.edu/help/introHTML/toc.html, downloaded pp. 1-157.

Lemay, Laura, "Teach Yourself Web Publishing with HTML 4 in 14 Days, Professional Reference Edition", Second Edition, Sams.net Publishing, 1997, pp. 778-789.

White, B. et al., "Standard Structural Elements" from "Web Content Accessibility Tips and Tricks", May 1, 2001, downloaded pp. 1-4.

Juran, J., "MML: The Modest Markup Language", Oct. 22, 2000, downloaded pp. 1-15.

University of Georgia Center for Continuing Education, "Exploring the World-Wide Web, Hypertext Markup Language", Feb. 24, 1999, downloaded pp. 1-7.

Cagle et al., "Professional XSL", Wrox Press Ltd., 2001, cover and copyright pp. 9-21.

"Introduction to XML" University of Washington Computing and Communications, copyright 1999, on the Internet as of Jun. 24, 2001, download from http://web.archive.org/web/20010624123830/ http://www.washington.edu/computing/training/540/xml_well.html, 1 pg.

Castro, E., "XML for the World Wide Web, Visual Quickstart Guide", Peachpit Press, 2001, p. 245.

Castro, Elizabeth, "XML for the World Wide Web", Published by Peachpit Press, 2001, pp. 182-184.

DevX Staff, "Twelve Dynamic HTML Lessons," downloaded from http://devx.com/projectcool/Article/18103/1763, published Jan. 1, 2000, pp. 1-3.

Mansfield, Ron, "Mastering Word 97 Fourth Edition", 1997, Sybex, pp. 269-270, 412, 449-457, 985-986, 1010-1011, 1028-1029, 1031-1034.

Munro, J., "StarOffice 6.0 Lives Up to its Name", PCMAG.com, May 23, 2002, www.pcmag.com/print_article2/0,1217,a=27287,00.asp, downloaded pp. 1-3.

Rodriguez, M., "XML: Twig", xmltwig.com, copyright 2003, downloaded pp. 1-4, web.archive.org/web/20030422002120/http://www.xmltwig.com/xmltwig/tools/xml_spellcheck.

Scott Boggan and Micael De Laurentis, A System for Matching static or distortable fonts; May 1994; pp. 1-9; http://www.byte.com/art/940/sec12/art1.htm.

Simplson, J., "Just XML", Prentice Hall, Second Edition, 2001, cover, copyright page, and p. 31.

W3C, Fonts, Jan. 24, 2001, W3C, pp. 1-4, http://web.archive.org/web/20010124044900/ ttp://www13.w3.org/TR/REC-CSS2/fonts.html#matching.

WayBack Machine, Feb. 15, 2006, p. 1, http://web.archive.org/web/*/http://www.w3.org/TR/REC-CSS2/fonts.html - No Copy Available, Dead Link.

XHTML Examples, "XHTML explained—XHTML Examples," download from http://web.archive.org/web/20020603200919/http://www.javascriptkit.com/howto/xhtml_intro4.Shtml, published Jun. 3, 2002, pp. 1-3.

Xmetal 1.0, Webreference.com, Oct. 29, 1999, downloaded pp. 1-2, www.webreference.com/html/watch/xmetal/5.html.

Castro, Elizabeth, "XML for the World Wide Web: Visual QuickStart Guide," Oct. 23, 2000, Peachpit Press, pp. 1-6.

Harold, Rusty Elliotte, "XML Bible", IDG Books Worldwide, 1999, title page, copyright page, and pp. 1-15, 95-132, 191-200, 333-336, 352-360, and 433-567.

Linss, Peter, "CSS Namespace Enhancements (proposal)", Jun. 1999, W3C, pp. 1-7.

Mansfield, Ron, "Mastering Word 97 Fourth Edition", 1997, Sybex, pp. 221-222, 271-273, 278, 280, 283-284, 325-330, 539-540, 1015.

Meyer, Eric, "Cascading Style Sheets: HTML and CSS", May 2000, O'Reilly, pp. 1-17.

O'Reilly, "HTML & XHTML The Definitive Guide," 4th Edition, Copyright 2000, pp. 1-6, http://oreilly.jungles.ru/webdesign/xhtml/ch16_03.htm.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

* cited by examiner

```
<xsd:element name="proofState" type="proofProperty" minOccurs="0">
</xsd:element>

<xsd:complexType name="proofProperty">
        <xsd:attribute name="spelling" type="proofType" use="optional">
        <xsd:attribute name="grammar" type="proofType" use="optional">
        </xsd:attribute>
</xsd:complexType>

<xsd:simpleType name="proofType">
        <xsd:restriction base="xsd:string">
                <xsd:enumeration value="clean">
                </xsd:enumeration>
                <xsd:enumeration value="dirty">
                </xsd:enumeration>
        </xsd:restriction>
</xsd:simpleType>
```

*Fig. 6*

REPRESENTING SPELLING AND GRAMMATICAL ERROR STATE IN AN XML DOCUMENT

RELATED APPLICATIONS

This patent application is a continuation-in-part application under 35 United States Code §120 of U.S. patent application Ser. No. 10/187,060 filed on Jun. 28, 2002, which is incorporated herein by reference. An exemplary schema in accordance with the present invention is disclosed beginning on page 11 in an application entitled "Mixed Content Flexibility," Ser. No. 10/726,077, filed Dec. 2, 2003, which is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

Recently, some word processors have begun producing documents that are somewhat XML compatible. For example, some documents may be parsed using an application that understands XML. Many features of the word processor, however, are not stored within the XML file. For example, spelling and grammar state information is not stored within the XML file. What is needed is a way to store spelling and grammar state within an XML document.

SUMMARY OF THE INVENTION

The present invention is directed towards marking spelling and grammar errors and proofing state of a word-processing document within XML.

According to one aspect of the invention, markers are used to show where a spelling or grammar error has occurred within the document.

According to another aspect of the invention, the proof state of the document is also stored. For example, has the document been fully checked for spelling or grammatical errors.

According to another aspect of the invention, the word processing document stored as XML may be parsed by an application that understands XML even though it is not the creator of the document.

BRIEF DESCRIPTION OF THE DRAWINGS

FIG. 6 illustrates an exemplary definition for a proof state element, in accordance with aspects of the invention.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's meaning according to that customer's wishes (e.g., customerName, address, etc. The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
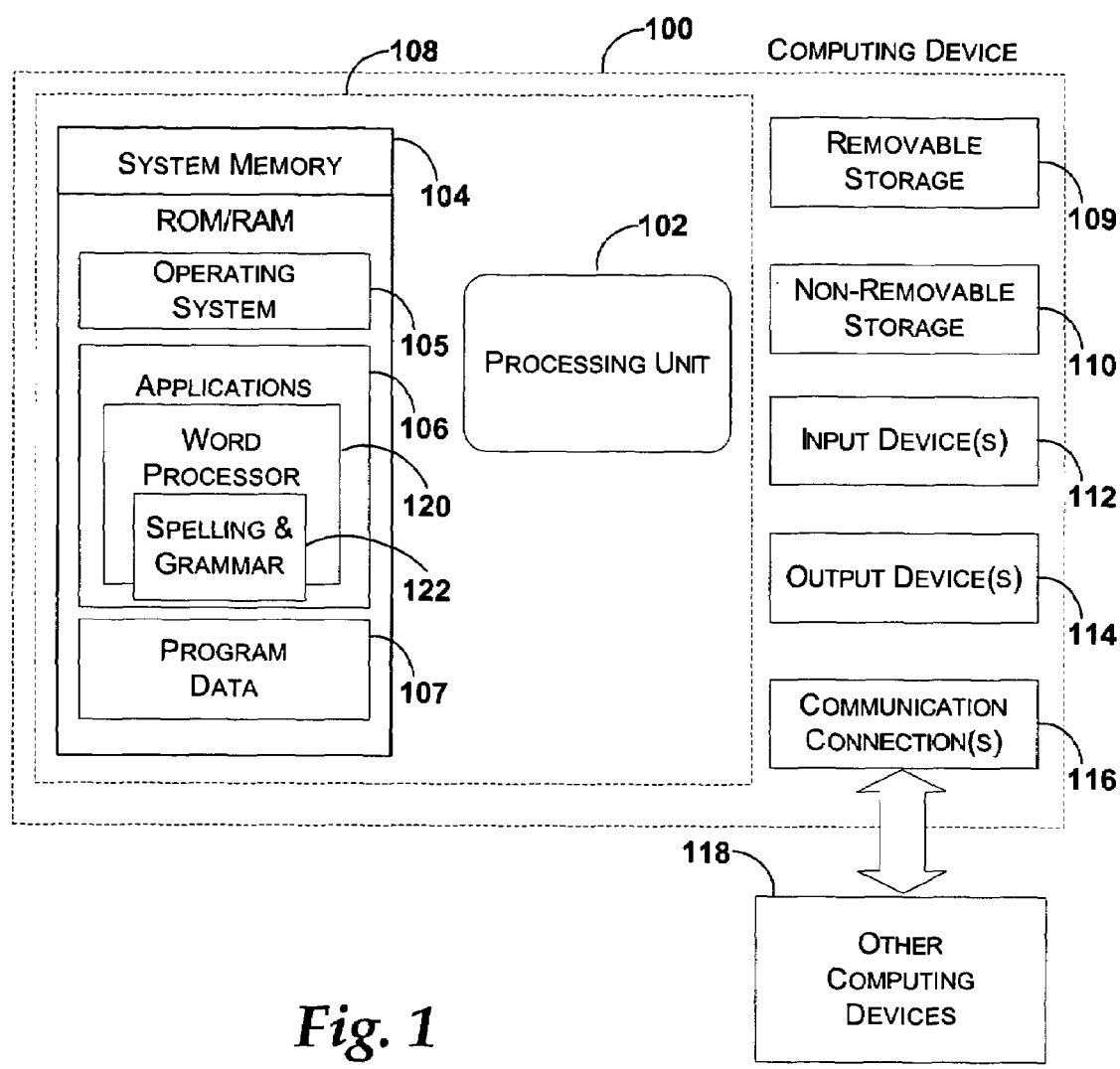
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes spelling and grammar application 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Word-Processor File Structure and Spelling and Grammar

Many word processors have built in spelling and grammar checking to assist users while editing their files. These are extremely powerful and popular features.

Storing the spelling and grammar state as XML, helps to make it possible to use other tools to look at the documents and tell the state of that document. Additionally, storing the states as XML helps to improve performance when opening the files using the word processor. If all the spelling and grammar errors are already marked, then the word processor does not have to pass over the entire document to check for spelling & grammar errors every time it is opened. It only needs to examine the areas that the user changes.

Figure 2:
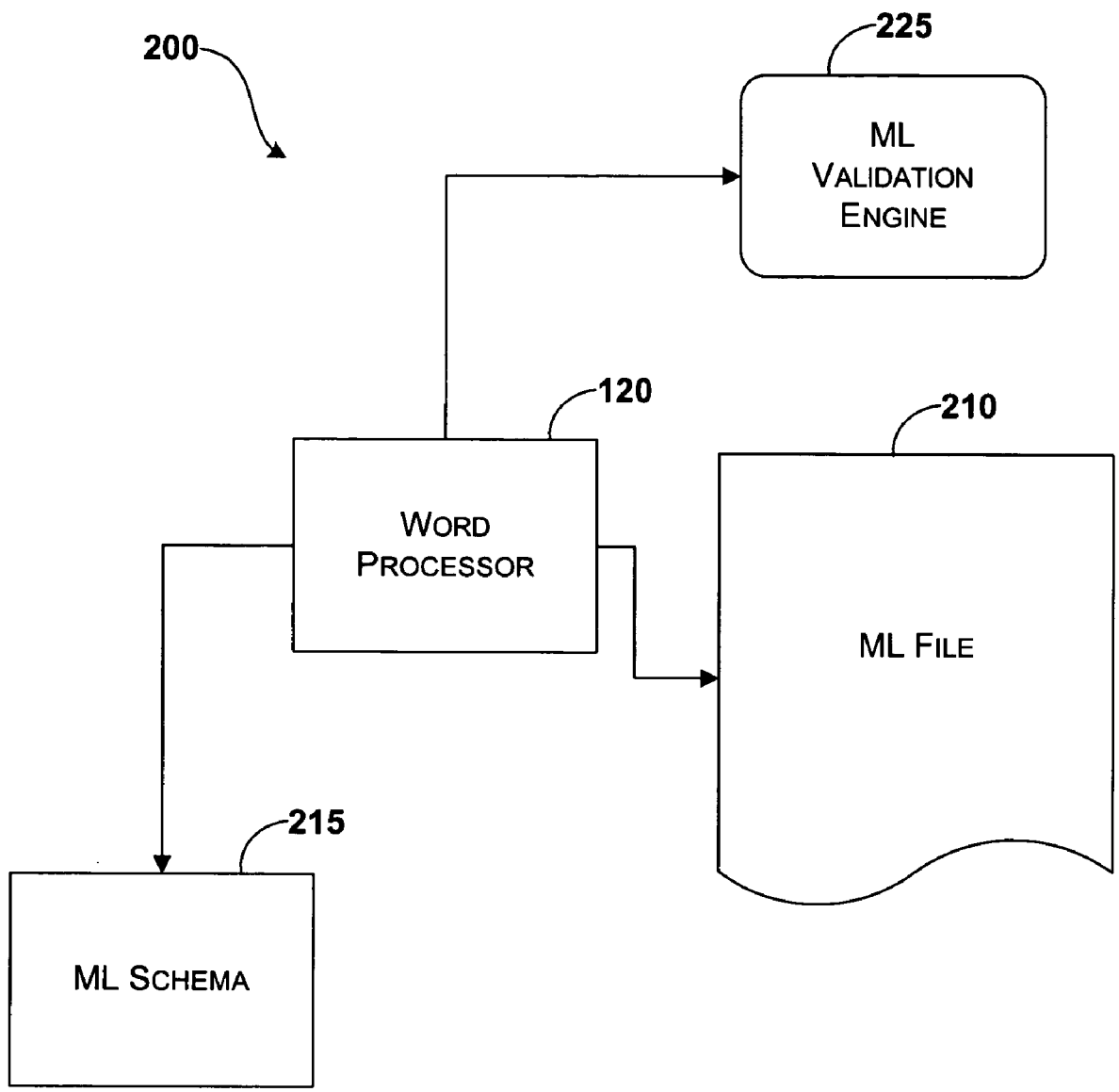
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML. Word-processor 120 internally validates ML file 210. When validated, the ML elements are examined as to whether they conform to the ML schema 215. A schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Figure 3:
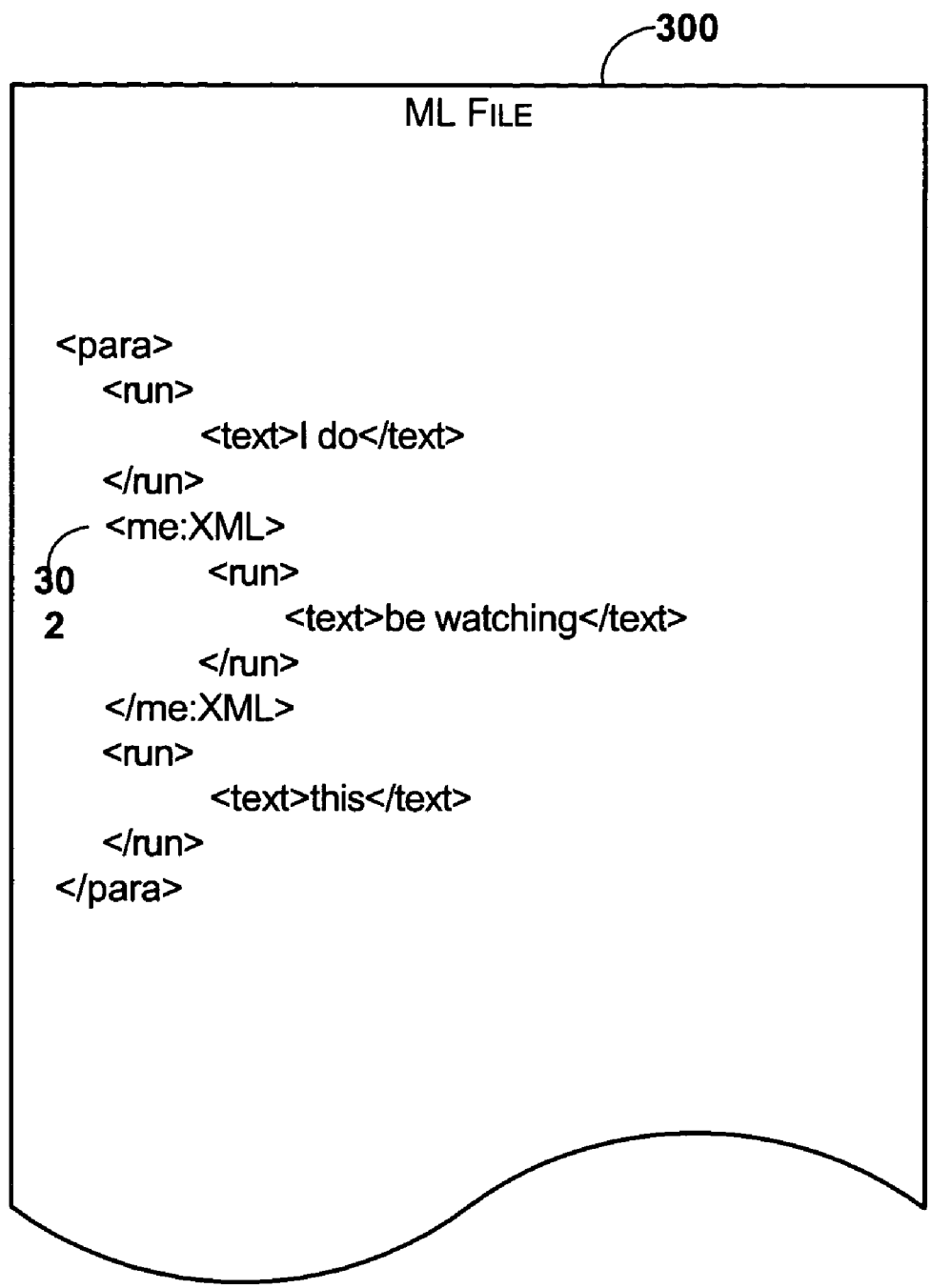
FIG. 3 illustrates an exemplary ML file.

FIG. 3 illustrates an exemplary ML file in accordance with aspects of the present invention. ML file 300 includes ML elements. An element in a markup language usually includes an opening tag (indicated by a "<" and ">"), some content, and a closing tag (indicated by a "</" and ">"). In this example, tags associated with ML include a "me:" within the tag (e.g., 302). The "me:" prefix is used as shorthand notation for the namespace associated with the element.

There are enough ML elements for an application that understands XML to fully recreate the document from a single XML file. Hint tags may also be included that provide information to an application to help understand the content of the file. The text contained within the document follows the "text" tag, making it easy for an application to extract the text content from a word-processing document created in accordance with aspects of the invention.

Take an XML file that has the following sentence containing a grammatical error:

"I do be watching this."

Also assume that the above sentence has an XML element <me:XML> applied to it around "be watching", such that the output XML looks as illustrated in FIG. 3.

Given that the example shown is valid, ML file 210 produces a document with a paragraph that includes the text "I do be watching this" in the first paragraph.

The phrase "do be" should be flagged as a grammar error. In order to maintain well formedness, the XML tag representing the error start can not be placed outside of the <me:XML> tag and end inside of it. For example, the following is not well formed XML:

```
<para>
   <run>
   <text>I</text>
   </run>
   <GrammarError>
   <run>
      <text>do</text>
   </run>
   <me:XML>
   <run>
      <text>be</text>
   </run>
   </GrammarError>
   <run>
      <text>watching</text>
   </run>
   </me:XML>
   <run>
```

```
<text>this</text>
    </run>
</para>
```

Figure 4:
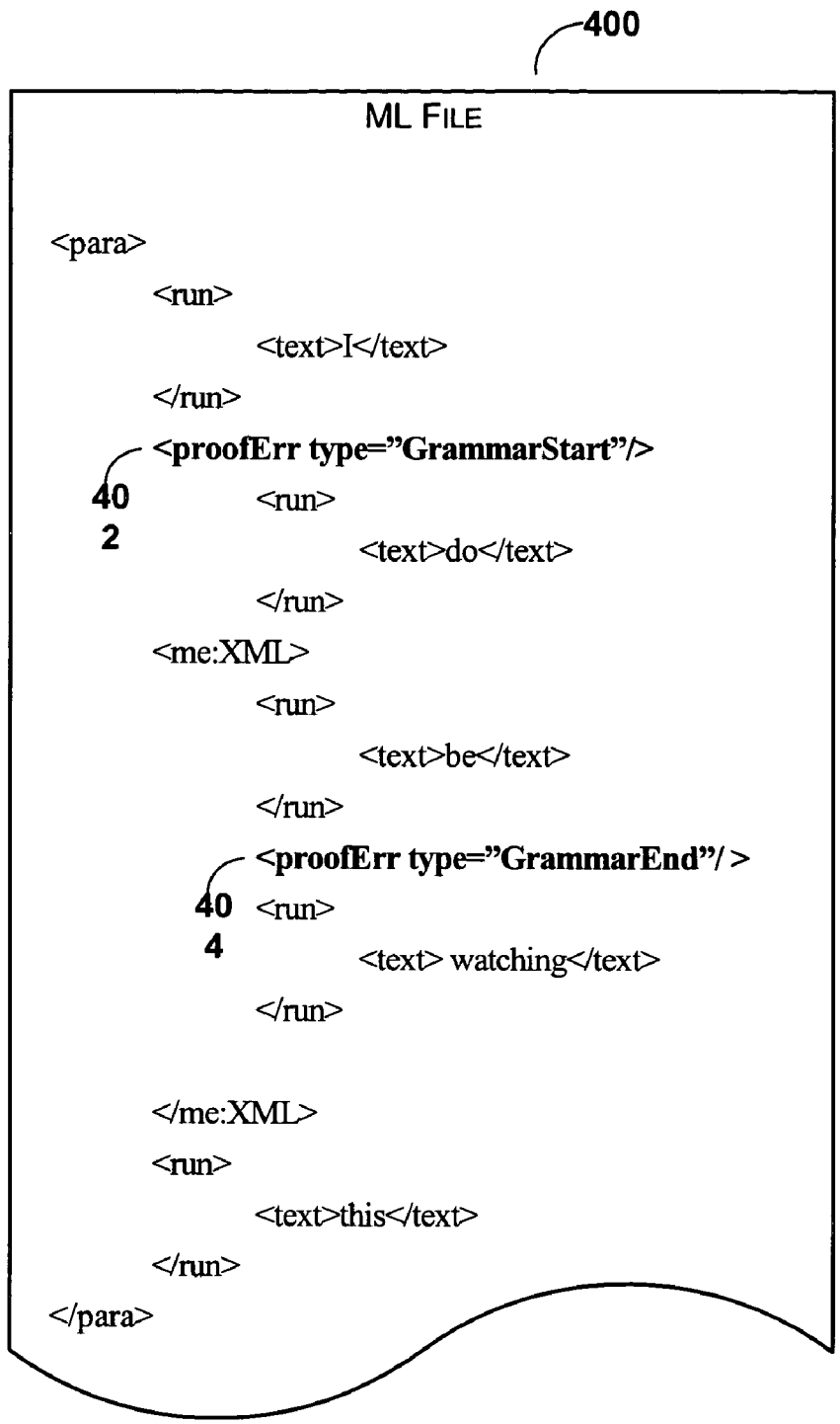
FIG. 4 illustrates an exemplary ML file including markers for a grammar error.

FIG. 4 illustrates an exemplary ML file including markers for a grammar error, in accordance with aspects of the invention. As illustrated in FIG. 4, the ML file includes a single tag (402) to represent the start of the grammar error, and another single tag (404) to represent the end of the grammar error. According to one embodiment of the invention, the tag representing the start of the grammar error is <proofErr type="GrammarStart"/> and the tag representing the end of the grammar error is <proofErr type="GrammarEnd"/>. Other tags may be used.

The following list is an exemplary list of proofErr types:

```
<xsd:simpleType name="proofErrType">
    <xsd:restriction base="xsd:string">
        <xsd:enumeration value="spellStart"></xsd:enumeration>
        <xsd:enumeration value="spellEnd">
            <xsd:annotation>
                <xsd:documentation>The spelling error is contained within spellStart and spellEnd.</xsd:documentation>
            </xsd:annotation>
        </xsd:enumeration>
        <xsd:enumeration value="gramStart"></xsd:enumeration>
        <xsd:enumeration value="gramEnd">
            <xsd:annotation>
                <xsd:documentation>The grammar error is contained within gramStart and gramEnd.</xsd:documentation>
            </xsd:annotation>
        </xsd:enumeration>
    </xsd:restriction>
</xsd:simpleType>
```

Figure 5:
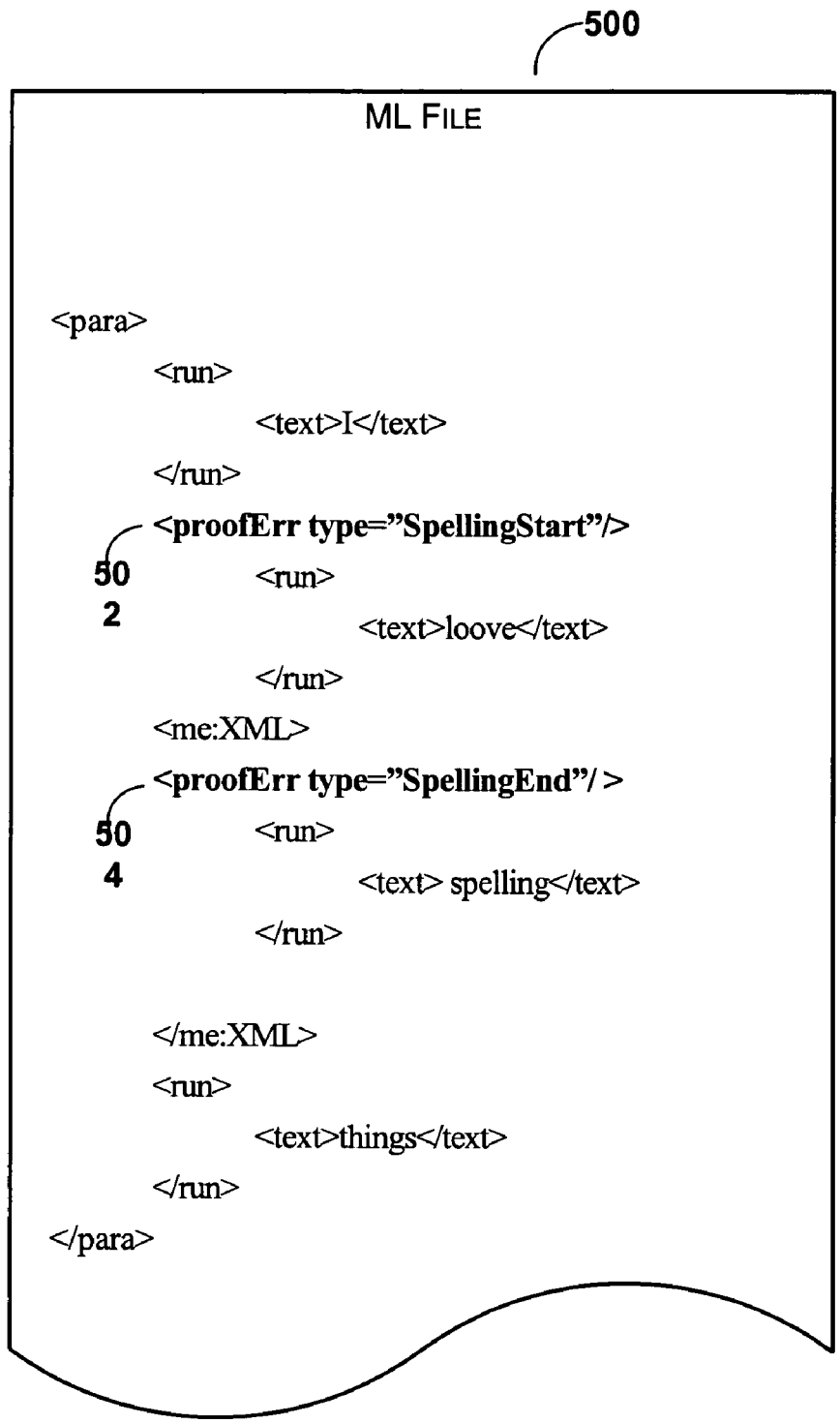
FIG. 5 illustrates an exemplary ML file including markers for a spelling error.

FIG. 5 illustrates an exemplary ML file including markers for a spelling error, in accordance with aspects of the invention. As illustrated in FIG. 5, the ML file includes a single tag (502) to represent the start of the spelling error, and another single tag (504) to represent the end of the spelling error.

FIG. 6 illustrates an exemplary definition for a proof state element, in accordance with aspects of the invention. The proof state of the document indicates whether the document has been fully checked for spelling & grammar errors. The proof state helps to make it possible to ignore a spelling error and save. When the file is reopened, the spelling error is still ignored. If proof state did not exist, the word processor would not know if the document has already been checked for spelling mistakes, and would therefore re-flag the error.

According to one embodiment, the ignored spelling error is not marked, and would, therefore, be re-flagged if there were no state information. A spelling error is explicitly marked with XML, but an ignored error has no marking. Any misspelling that is not flagged (when the proof state is clear), can be assumed to have already been ignored by the user.

The following is a commented definition for the proofState element that defines the state of the document:

```
<xsd:element name="proofState" type="proofProperty" minOccurs="0">
    <xsd:annotation>
        <xsd:documentation>The state of proofing tools in this document.</xsd:documentation>
    </xsd:annotation>
</xsd:element>
<xsd:complexType name="proofProperty">
    <xsd:annotation>
        <xsd:documentation>The state of proofing tools in this document.</xsd:documentation>
    </xsd:annotation>
    <xsd:attribute name="spelling" type="proofType" use="optional">
        <xsd:annotation>
            <xsd:documentation>The state of the spell checker in this document.</xsd:documentation>
        </xsd:annotation>
    </xsd:attribute>
    <xsd:attribute name="grammar" type="proofType" use="optional">
        <xsd:annotation>
            <xsd:documentation>The state of the grammar checker in this document.</xsd:documentation>
        </xsd:annotation>
    </xsd:attribute>
</xsd:complexType>
<xsd:simpleType name="proofType">
    <xsd:annotation>
        <xsd:documentation>Proofing Tools state values.</xsd:documentation>
    </xsd:annotation>
    <xsd:restriction base="xsd:string">
        <xsd:enumeration value="clean">
            <xsd:annotation>
                <xsd:documentation>The proofing tool finished checking this document. Errors are marked and only the errors will be rechecked on open.</xsd:documentation>
            </xsd:annotation>
        </xsd:enumeration>
        <xsd:enumeration value="dirty">
            <xsd:annotation>
                <xsd:documentation>The proofing tool did not finish checking this document. The entire document will be rechecked on open.</xsd:documentation>
            </xsd:annotation>
        </xsd:enumeration>
    </xsd:restriction>
</xsd:simpleType>
```

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium, comprising:
   a first component for interpreting a word-processor document stored as an XML file; and
   a second component that is configured to perform actions, including:
      placing a first XML element that includes an opening tag and an ending tag that is placed before the beginning of an XML element that contains a spelling error and placing a second XML element that includes an opening tag and an ending tag that is placed after the XML element that contains the spelling error; wherein the first XML element includes an identifier indicating that it represents the beginning of the spelling error and wherein the second XML element includes an identifier indicating that it represents the end of the spelling error; wherein the first XML element and the second XML element do not include child elements and do not include content; wherein placement of the first XML element and the second XML element within the XML file do not affect the well formedness of the XML file; and placing a third XML element that includes an opening tag and an ending tag that is placed before the beginning of one or more XML elements that contain a grammar error and placing a fourth XML element that includes an opening tag and an ending tag that is placed after the one or more XML elements that contain the grammar error; wherein the third XML element includes an identifier indicating that it represents the beginning of the grammar error and wherein the fourth XML element includes an identifier indicating that it represents the end of the grammar error; wherein the third XML element and the fourth XML element do not include child elements and do not include content; wherein placement of the third XML element and the fourth XML element within the XML file do not affect the well formedness of the XML file.

2. The computer-readable storage medium of claim 1, further comprising a third component for placing a proof state within the word-processor document; wherein placing the proof state comprises placing a placing an XML proof state element within the word-processor document that includes an opening tag and an ending tag; wherein the proof state element includes a spelling attribute and a grammar attribute.

3. The computer-readable storage medium of claim 2, wherein the first XML element, the second XML element, the third XML element, and the fourth XML element are the same type of XML element.

4. The computer-readable storage medium of claim 3, wherein the first XML element, the second XML element, the third XML element, and the fourth XML element include an enumeration value that is selected from a spell start enumeration value, a spell end enumeration value; a grammar start enumeration value and a grammar end enumeration value.

5. The computer-readable storage medium of claim 2, wherein the third component for placing the XML proof state element within the word-processor document, further comprises indicating when the word-processor document is in a clean state through an enumeration value that is associated with the XML proof state element.

6. The computer-readable storage medium of claim 5, wherein the third component for placing the XML proof state element within the word-processor document, further comprises placing a spelling proof state property.

7. The computer-readable storage medium of claim 6, wherein the third component for placing the XML proof state element within the word-processor document, further comprises placing a grammar proof state property.

8. A method for indicating errors within a word-processor document, comprising:

at a computing device, interpreting a word-processor document stored as an XML file;

at a computing device, placing a first XML element that includes an opening tag and an ending tag before the beginning of an XML element that contains an error that is selected from a grammar error and a spelling error; wherein the first XML element includes an identifier indicating that it represents the beginning of the error; wherein the first XML element does not include child elements and does not include content;

at a computing device, placing a second XML element that includes an opening tag and an ending tag after the XML element that contains the error; wherein the second XML element includes an identifier indicating that it represents the end of the error; wherein the second XML element does not include child elements and does not include content; wherein placing the first XML element and the second XML element do not affect the well formedness of the XML file.

9. The method of claim 8, further comprising placing an XML proof state element within the word-processor document.

10. The method of claim 9, wherein the first XML element and the second XML element are the same type of XML element.

11. The method of claim 9, wherein the first XML element and the second XML element include an enumeration value that is selected from a spell start enumeration value, a spell end enumeration value; a grammar start enumeration value and a grammar end enumeration value.

12. The method of claim 9, wherein placing the XML proof state element within the word-processor document, further comprises indicating when the word-processor document is in a clean state and a dirty state.

13. The method of claim 12, wherein placing the XML proof state element within the word-processor document, further comprises placing a spelling proof state property.

14. The method of claim 13, wherein placing the XML proof state element within the word-processor document, further comprises placing a grammar proof state property.

15. A system for indicating errors within a word-processor document, comprising:

a processor; and a memory, the memory being allocated for a plurality of computer-executable instructions which are loaded into the memory for execution by the processor, the computer-executable instructions performing steps comprising: a markup language file output by a word processor that includes a first XML element that includes an opening tag and an ending tag that is placed before the beginning of an XML element that contains an error that is one of a grammar error and a spelling error; wherein the first XML element includes an identifier indicating that it represents the beginning of the error; wherein the first XML element does not include child elements and does not include content; a second XML element that includes an opening tag and an ending tag after the XML element that contains the error; wherein the second XML element includes an identifier indicating that it represents the end of the error; wherein the second XML element does not include child elements and does not include content;

and a validation engine configured to validate the markup language file; and an application configured to read a markup language file created in accordance with a schema.

16. The system of claim 15, wherein the first XML element and the second XML element are the same type of XML element.

17. The system of claim 16, wherein the markup language file further comprises an XML proof state element.

18. The system of claim 17, wherein the XML proof state element, further comprises a clean state attribute and a dirty state attribute.

19. The system of claim 18, wherein the XML proof state element further comprises a spelling proof state property and a grammar proof state property.

20. The system of claim 16, wherein the first XML element and the second XML element include an enumeration value that is selected from a spell start enumeration value, a spell end enumeration value; a grammar start enumeration value and a grammar end enumeration value.

21. The system of claim 16, wherein an XML proof state element indicates that the document has been fully checked for at least one of spelling errors and grammar errors.

* * * * *